(12) United States Patent
Bae et al.

(10) Patent No.: US 6,996,580 B2
(45) Date of Patent: Feb. 7, 2006

(54) SYSTEM AND METHOD FOR GRANULAR CONTROL OF MESSAGE LOGGING

(75) Inventors: Myung M. Bae, Pleasant Valley, NY (US); Jifang Zhang, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 770 days.

(21) Appl. No.: 09/887,787

(22) Filed: Jun. 22, 2001

(65) Prior Publication Data

US 2003/0018619 A1 Jan. 23, 2003

(51) Int. Cl.
*G06F 17/30* (2006.01)

(52) U.S. Cl. ...................... 707/200; 707/203; 707/204; 714/1; 714/43; 714/45

(58) Field of Classification Search ................. 700/200, 700/203, 204; 714/1, 43, 45; 707/7, 101, 707/102, 104; 718/100, 101, 102
See application file for complete search history.

(56) References Cited

U.S. PATENT DOCUMENTS

| | | | |
|---|---|---|---|
| 5,832,515 A | 11/1998 | Ledain et al. ............... 707/202 |
| 5,847,972 A | 12/1998 | Eick et al. ............... 364/514 A |
| 5,966,706 A | 10/1999 | Biliris et al. .................. 707/10 |
| 5,996,054 A | 11/1999 | Ledain et al. ............... 711/203 |
| 6,055,604 A | 4/2000 | Voigt et al. .................. 711/117 |
| 6,078,999 A | 6/2000 | Raju et al. ................... 711/161 |
| 6,092,087 A | 7/2000 | Mastors ....................... 707/202 |
| 6,131,094 A | 10/2000 | Gord ............................. 707/8 |
| 6,148,338 A | 11/2000 | Lachelt et al. .............. 709/224 |
| 6,148,368 A | 11/2000 | DeKoning .................. 711/113 |
| 6,178,427 B1 | 1/2001 | Parker ......................... 707/202 |
| 6,212,653 B1 | 4/2001 | Boivin et al. ................. 714/45 |
| 6,247,149 B1 * | 6/2001 | Falls et al. .................... 714/45 |
| 6,460,049 B1 * | 10/2002 | Becker et al. ........... 707/104.1 |
| 6,697,849 B1 * | 2/2004 | Carlson ...................... 709/219 |
| 2002/0108017 A1 | 8/2002 | Kenchammana-Hoskote et al. .......................... 711/113 |
| 2002/0152429 A1 * | 10/2002 | Bergsten et al. .............. 714/43 |

* cited by examiner

*Primary Examiner*—Shahid Alam
*Assistant Examiner*—Hung Pham
(74) *Attorney, Agent, or Firm*—Lawrence D. Cutter

(57) ABSTRACT

A system and method for controlling log files is provided in which each log file entry is associated with an importance level. Depending on the importance level, the log entry is stored in a separately maintained set of files which can thus be rotated on different schedules so that the more important log file entries are retained for appropriately longer periods of time so as to be better able to reconstruct event histories and reports for important events.

8 Claims, 1 Drawing Sheet

SYSTEM AND METHOD FOR GRANULAR CONTROL OF MESSAGE LOGGING

BACKGROUND OF THE INVENTION

The present invention is generally directed to the creation of log files in data processing systems. More particularly, the present invention is directed to systems and methods which provide an increased level of message granularity during the storage of log messages. Even more particularly, the present invention is directed to systems and methods which prevent erasures of log messages which are important for the reconstruction of event chains which describe the course of events leading to system problems.

A process running on a data processing system, including but not limited to distributed or parallel processing systems, may produce a running log which provides details associated with various events which occur during the process. These processes produce event logs or activity history logs whose size cannot be determined beforehand. While it is the case that the processes that generate such logs generally fall into the category of non-interactive processes such as daemons, interactive processes are also capable of generating messages and event descriptions that are stored in a log file. These log files, or more commonly "logs," are especially useful for postmortem debugging and problem analysis. Some long running processes, such as daemon processes such as those which are distributed over many nodes in a distributed data processing systems, may generate log files which are very long and the system is thus compelled to create large activity logs which require an appropriate mechanism for storage and later retrieval, if necessary. However, it is not desirable, and it is sometimes completely unacceptable, to produce log files of an unlimited or even indeterminately large size. Log files of uncontrollably large size are undesirable since they limit storage, inhibit performance and add to the administrative overhead and burden of data processing systems.

Some data processing applications solve the problem of log file size management through the use of techniques which limit the size of the log file. This may be accomplished in several ways. In a first approach the file may be restricted to a certain maximum size and entries made to it are made in a first-in-first-out manner (finite sized push down stack) when the maximum file size is reached. In a variant of this approach, early file entries are overwritten when the maximum file size is reached. In yet another approach to this problem, a rotating file structure is provided so that, if the log file reaches a certain limit, subsequent log entries (also referred to herein as "messages,""log messages, ""message entries," or "log message entries") are written to a completely new file. For example, if the current log file exceeds the predetermined limit for log file size, the current log file is named as a backup file, and another log file is created with the current log file name. Yet another approach to this problem is simply to reduce the number of log entries that are generated. However, this approach defeats the very purpose of maintaining an accurate and detailed event history. Although such abbreviated files are more easily managed, their content is often significantly lacking in the details desired for report generating purposes. While all of these approaches to the problem provide some help in limiting the amount of storage utilized, there are still several problems that are not solved by any of these methods.

For example, when the log file is truncated and wrapped many times, it is very often not possible to track certain important event or activity entries. The "wrapping"approach is thus seen to be particularly disadvantageous if a problem occurs at a customer site or at a remote site and the lost log entries provide the key elements needed to determine solutions to an underlying problem. In such circumstances, this approach clearly demonstrates that it has major drawbacks.

Another significant disadvantage that exists for conventional logging approaches is that they do not provide any granularity based upon the absolute or even relative importance of the log entries. Certain events or activity log entries may be more important than other entries. These log entries, as created by the running application or process, tend to be especially important for after-the-fact debugging and/or analysis.

SUMMARY OF THE INVENTION

In a preferred embodiment of the present invention a system and method for controlling log files is provided. The method comprises a first step of determining the importance of a received log entry. The importance level is preferably an integer assigned by the application program or process. Depending on the importance level associated with the entry, it is stored in one of two pairs of alternating file structures. The entries into the individual files in each pair are made so that, as one of the pairs becomes filled to a capacity level, a switch is made to storage into the other file in the pair. The switching of files occurs thereafter on a periodic basis as the respective files become full. In its most general form, however, the present invention is not limited to an importance level granularity of "2." Any convenient number, n, of importance levels may be employed. It is also noted that the present invention is also not limited to a single pair of files at each importance level, nor is it limited in the sense that each level of importance possesses the same number of "backup," "switched," "rotating," or "alternating" files, all of these terms being meant to apply synonymously herein. Additionally, it is noted that the length of the message associated with each log file entry is not required to be the same for each entry. It is further noted that the log files associated with each importance level do not have to possess the same predetermined capacity for alternation purposes. It is also noted that, when switching to a different storage file at the same importance level occurs, there is no need to erase or purge any of the current contents of that file; however, doing so is still within the broad scope of the present invention.

Accordingly, it is an object of the present invention to prevent the erasure or discarding of log file entries which are needed to reconstruct specific event histories.

It is also an object of the present invention to provide granularity in determining which log messages are to be kept and which are to be discarded over a period of time of system operation. It is a further object of the present invention to enable the generation of more complete and accurate reports based on accumulated log files.

It is yet another object of the present invention to provide a simple mechanism for categorizing log messages. further object of the present invention to increase the period of time over which log files are retained.

It is an additional object of the present invention to enhance the quality and accuracy of reports generated from log files.

Lastly, but not limited hereto, it is yet another object of the present invention to enhance the utility, duration and effectiveness of log files in distributed data processing systems.

The recitation herein of a list of desirable objects which are met by various embodiments of the present invention is not meant to imply or suggest that any or all of these objects are present as essential features, either individually or collectively, in the most general embodiment of the present invention or in any of its more specific embodiments.

DESCRIPTION OF THE DRAWINGS

The subject matter which is regarded as the invention is particularly pointed out and distinctly claimed in the concluding portion of the specification. The invention, however, both as to organization and method of practice, together with the further objects and advantages thereof, may best be understood by reference to the following description taken in connection with the accompanying drawings in which:

DETAILED DESCRIPTION OF THE INVENTION

Figure 1:
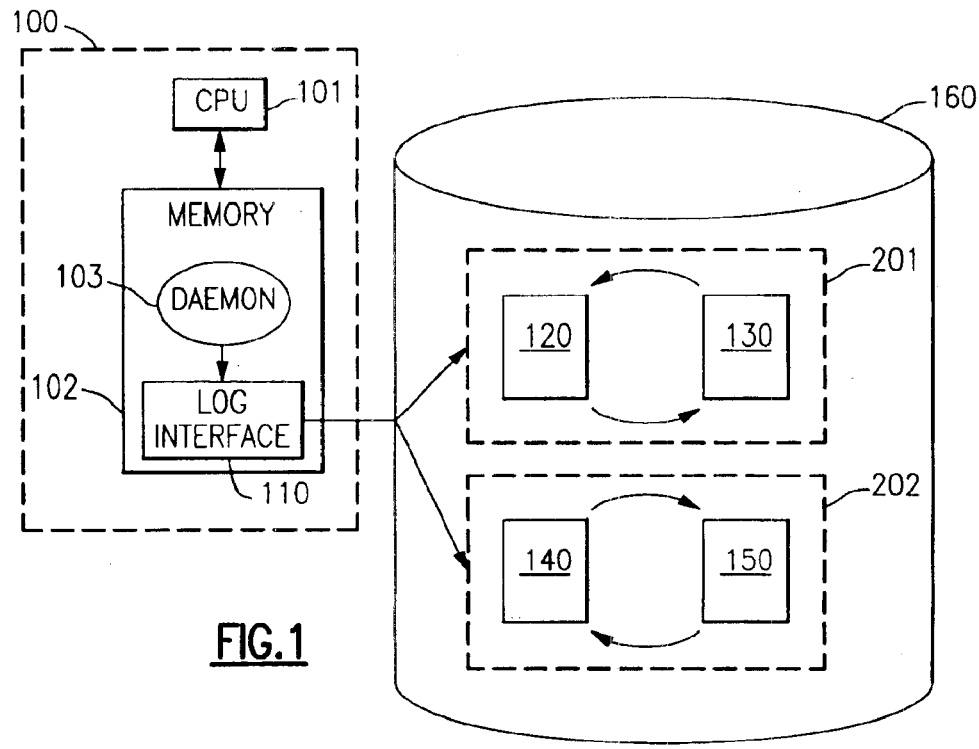
FIG. 1 is a block diagram illustrating the operation of a preferred embodiment of the present invention and particularly illustrating two-level granularity for log file maintenance.

FIG. 1 illustrates both the simplest environment in which the present invention operates and the structure of the files employed in a preferred embodiment of its operation. In particular, distributed node 100, such as may exist in a p-Series data processing system (formerly the RS/6000 SP series) as manufactured and supplied by the assignees of the present invention, includes central processing unit (CPU) 101 which accesses random access memory (RAM) 102. Memory 102 includes one or more daemon programs 103 running as described above. Such programs often perform on going monitoring operations and are capable of generating messages indicating the existence of various machine states at various times. In the present invention these messages are provided to Log Interface 102. It is this interface that causes log messages to be written to disk drive 160 which contains a file structure which is specifically adapted to receive and store the log message entries in the manner called for in the present invention. While storage device 160 is specifically mentioned as a disk drive, any appropriate nonvolatile storage medium may be employed.

Depending on importance level, log entries are written to a first or second pair of files, 201 or 202 respectively. First file pair 201 includes files 120 and 130. It may be assumed without loss of generality that file pair 201 is employed for storing more important messages. Before any log entries have been generated, files 120 and 130 are empty (or at least considered by the operating system of the computer to be empty). One of the pair, say file 120, receives log entries for storage. As this file becomes full, subsequently received log entries are stored in the other file in the pair, say file 130. As file 130 also becomes full, storage is again switched back to file 120 where some entries now have to be rewritten. Since storage into these files occurs in a time order, it is preferred that they be overwritten in this order rather than simply erasing the contents of one of the files 120 or 130. However, simple erasure is still within the scope of the present invention. But to preserve information for the longest possible duration under the circumstances, it is preferred that a pointer be maintained directed to the most currently written record (or to the next available file slot if that is programmatically more convenient).

Unlike single log storage for conventional approaches to the problems involved, the present invention manages multiple log storages for each life span log. Application Log Interface 110 automatically distributes user-provided log messages to appropriate log storage based on the importance or period level. A time stamp is also be added to each log when it is written. Since more important messages should be retained for longer periods of time, it is also possible to characterize the present invention as being one based on the length of time (time span) over which the message should be saved. Messages which should be saved for longer or shorter periods of time may be retained in different log file structures which are managed separately and/or independently. Accordingly, the typical log entry written into a log file has the following structure:

<TimeStamp>+<importance>+<user-message>.

This structure is typically created in response to a call or command to Log Interface 110 which is likely to be expressed in a programmatic format such as the following:

Log(<importance-and-period-level>, message).

Figure 2:
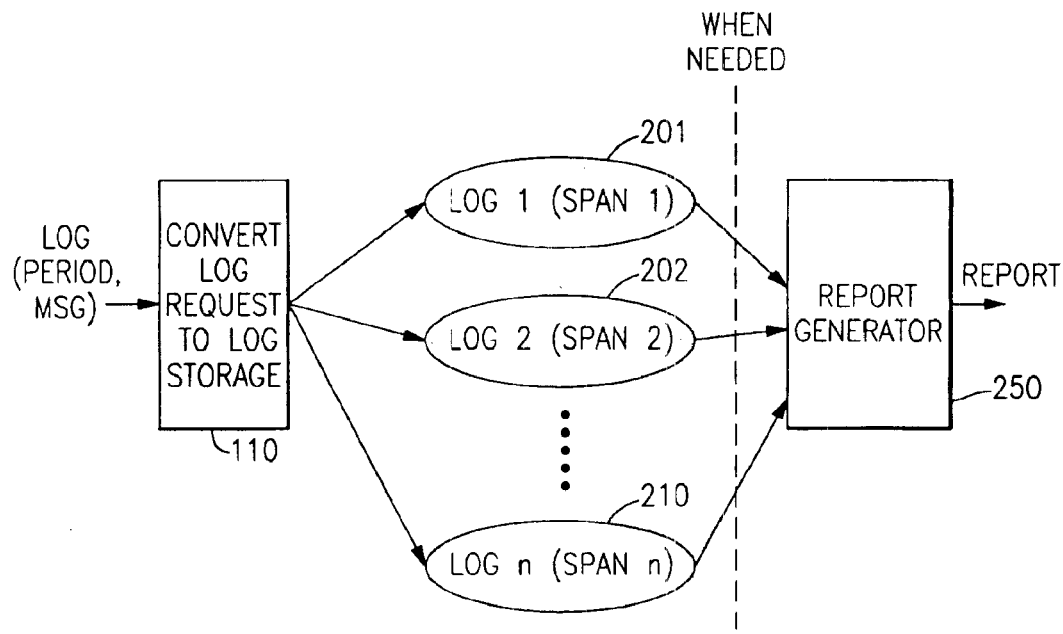
FIG. 2 is a block diagram illustrating the operation of the log interface provided for the operation of the present invention.

Attention is now directed to a discussion of the operation of the function blocks show in FIG. 2. In particular, block 110 (the Log Interface) manages the relationship between the log storage instances and their periods and it converts user log requests to log file storage format by adding the time stamp. Each block 201 through 210 maintains the corresponding log storage and wraps or recycle the log if the log storage reaches the upper limit of its predetermined storage constraint size. Finally, functional block 250 is used on an on-demand basis to generate reports by merging log entries from each log storage (log1 through logn). The operations carried out in function block 110 are representable using the pseudo-code provided below where the following definitions are applied:

Log(<importance-and-period level>, message)–a function which writes a message to a log file which is associated with a <period level>.

Importance-and-period-level=a value defined by the application and/or period levels to indicate which period log files will be used (for example, used in a report). Depending on the need, period-level may be same as the importance.

LimitSizes[MaxPeriods]–maximum size of the log files

CurSizes[MaxPeriods]=current size of the log lines

Logfile[MaxPeriods]=file descriptors of the each period log

```
Log(importance-and-period-level, message)
{
    Get importance and/or period from level( )
    Msg = Construct log output (importance, messages);  // timestamp
                                                            added here
    For each p in period level
        Write msg to logfile[p]
        Increment CurSizes[p] by the size of 'message';
        If(CurSizes[p] > LimitSizes[p]) {
            Wrap_logfile(p)
            CurSizes[p] = 0;
        }
    }
}
```

In other words, when a log request with a period arrives, function block 110 first maps it to the associated sets of log storage files. Second, the log message with its associated time stamp is written into the appropriate level log storage file. While writing the message (msg=the message string variable), the size of each log storage is checked and limited.

Most solutions to the problem of runaway log file size and management have simply attempted to reduce the number of log messages so that the log file is wrapped slowly. However, the basic problem of size and lost history trails still remains in these solutions because the important history entries are still lost when the log file wraps. By using the concept of the level of importance and periods, the present invention solve this problem as well.

The present invention solves the above problems by providing the following:

- a simple way to categorize the granularity of the importance level so that the log entries can be easily sortable by an appropriate priority or importance level.
- a simple way to keep the important activity logs for longer periods of time even under constrained storage conditions and even if "normal" logs are wrapped and disappear. (This is the case since it is generally true that more important events tend to occur less frequently than the less important events.)
- one simple interface to produce the multiple life-span logs without considering the details in managing multiple life span logs.
- a time stamp so that the multiple logs can be easily re-merged for report generation purposes.
- that the log storage entries are made to a file in a standard manner but one which also acts as a media or buffer which is controllable in size (e.g., as in a bounded ring buffer).

Therefore, applications which utilize the Log Interface of the present invention possess the following advantages:

- Applications can preserve activity logs for longer periods of time while still maintaining the ability to control the size of the activity logs, particularly when compared to simple logging schemes.
- Applications also have the benefit of having available the ability to sort and analyze previously categorized log entries in accordance with either importance, time or type.
- Applications are still able to "see" all of the log message entries simply by merging the multi-life span logs.

It should also be particularly noted that, while the preferred embodiment of the present invention is described herein as providing a pair of alternating files for each level of importance whose granularity is sought to be preserved, the invention, in its broader sense includes those methods and systems which incorporate a plurality of backup files for each level. In those circumstances in which more than two such files are provided, the preferred approach is to use them in the cyclical order which provides the log entries for the longest period of time. This approach is optimal for tracking back through sequences of log history events associated with given problem. It should also be noted that, in accordance with the present invention, granularity improvements are not limited to only two levels of importance. It should also be noted tat, in some contexts, what is described herein as a "level of importance" might be described elsewhere as a "severity level," "priority level," "problem level" or the like.

While the invention has been described in detail herein in accordance with certain preferred embodiments thereof, many modifications and changes therein may be effected by those skilled in the art. Accordingly, it is intended by the appended claims to cover all such modifications and changes as fall within the true spirit and scope of the invention.

The invention claimed is:

1. A computer implemented method for controlling log file comprising the steps of:

determining an importance level for a received log entry;

storing said received log entry in a first file if said importance level is above a predetermined threshold and in a second file otherwise;

switching storage from said first file to an alternate first file in response to said first file reaching its predetermined capacity;

switching storage from said alternate first file to said first file in response to said alternate first file reaching its predetermined capacity;

switching storage from said second file to an alternate second file in response to said second file reaching its predetermined capacity;

switching storage from said alternate second file to said second file in response to said alternate second file reaching its predetermined capacity.

2. The method of claim 1 in which the predetermined capacity of said first file is the same with said alternate first file.

3. The method of claim 1 in which the predetermined capacity of said second file is the same with said alternate second file.

4. The method of claim 1 further including the step of generating a report from a plurality of log file entries retrieved from one of said first file, alternate first file, second file and alternate second file in the same time order in which the log entries were stored.

5. The method of claim 1 in which all of said log file entries are of the same.

6. The method of claim 1 in which the number of distinct importance level is two.

7. The method of claim 1 in which said log file entries include a time stamp.

8. A computer program product stored on a machine-readable medium for controlling log file comprising:

determining an importance level for a received log entry;

storing said received log entry in alternating ones of a first file pair if said importance level is above a predetermined threshold, wherein switching storage between files of said first file pair occurs as one file in the first file pair reaches a predetermined capacity;

storing said received log entry in alternating ones of a second file pair if said importance level is below a predetermined threshold, wherein switching storage between files of said second file pair occurs as one file in the second file pair reaches a predetermined capacity.

* * * * *